No. 639,665. Patented Dec. 19, 1899.
R. COMMICHAU.
PROCESS OF MANUFACTURING SCYTHES OR SICKLES.
(Application filed Jan. 21, 1899.)

(No Model.) 2 Sheets—Sheet 1.

Witnesses:

Inventor:
Rudolf Commichau
by Foster Freeman
Attys.

THE NORRIS PETERS CO., PHOTO-LITHO., WASHINGTON, D. C.

No. 639,665. Patented Dec. 19, 1899.
R. COMMICHAU.
PROCESS OF MANUFACTURING SCYTHES OR SICKLES.
(Application filed Jan. 21, 1899.)

(No Model.) 2 Sheets—Sheet 2.

UNITED STATES PATENT OFFICE.

RUDOLF COMMICHAU, OF MAGDEBURG-SUDENBURG, GERMANY.

PROCESS OF MANUFACTURING SCYTHES OR SICKLES.

SPECIFICATION forming part of Letters Patent No. 639,665, dated December 19, 1899.

Application filed January 21, 1899. Serial No. 702,952. (No specimens.)

*To all whom it may concern:*

Be it known that I, RUDOLF COMMICHAU, a subject of the King of Prussia, Emperor of Germany, residing at Magdeburg-Sudenburg, Germany, have invented certain new and useful Improvements in Processes of Manufacturing Scythes or Sickles, of which the following is a specification.

Figure 1:
Figure 2:
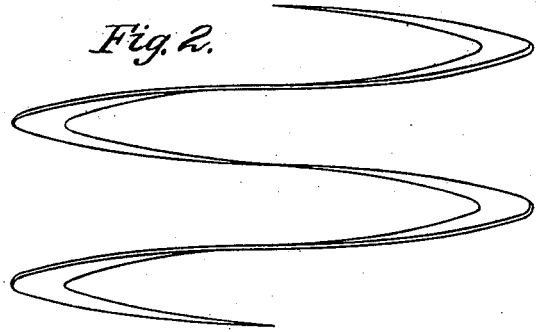
Figure 3:
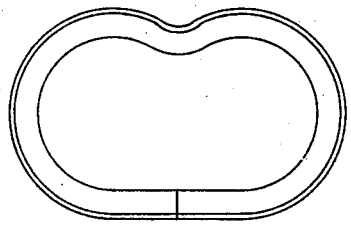
Figure 4:
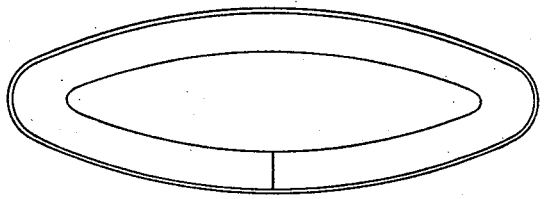
Figure 5:
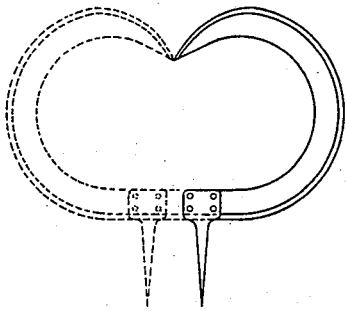
Figure 6:
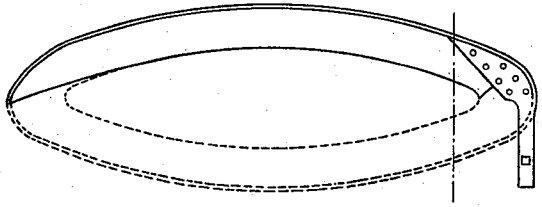
Figure 7:
Figure 8:
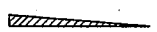
Figure 9:
Figure 10:
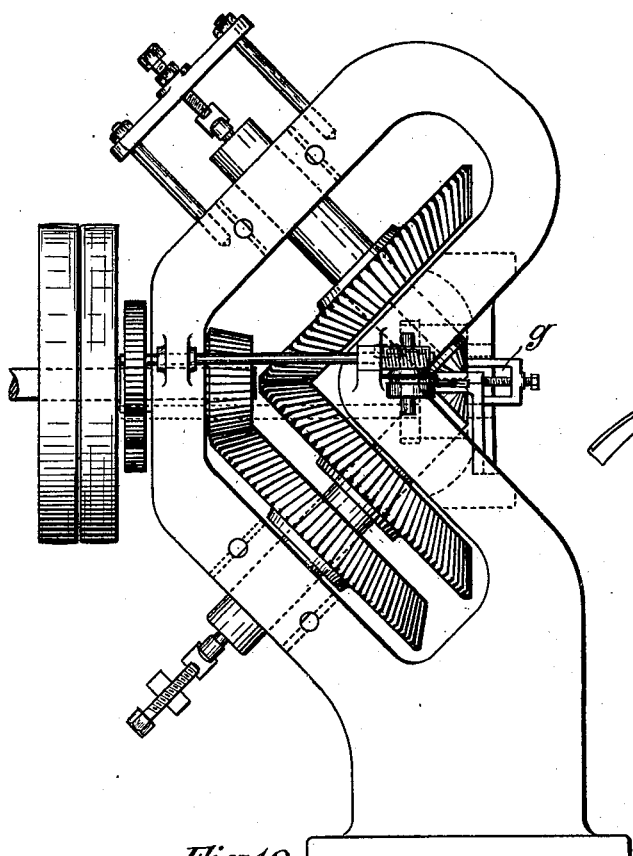
Figure 11:
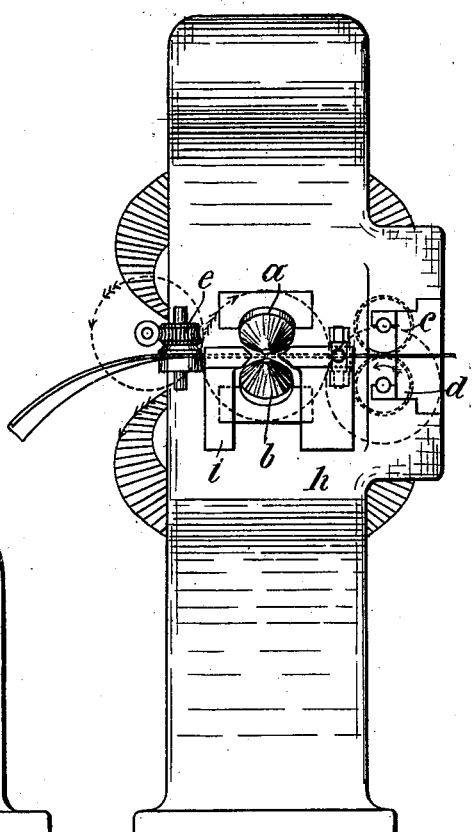
Figure 12:
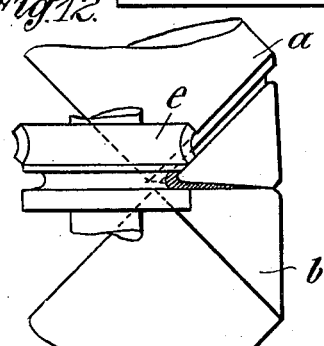
Figure 13:
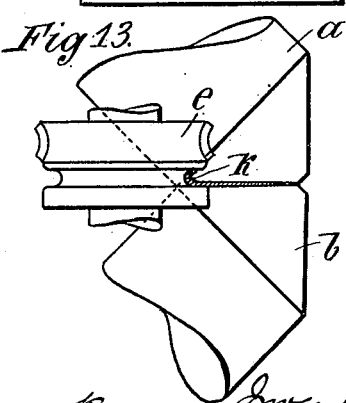

In the accompanying drawings, Figures 1, 2, 3, and 4 illustrate the general shape of the strips of metal from which the articles are to be made. Figs. 5 and 6 indicate how the strips can be separated to form the articles. Figs. 7, 8, and 9 are detail views showing sections of the blades. Figs. 10 and 11 are respective side and end elevations of a machine by which the invention may be carried out. Figs. 12 and 13 are enlarged detail views of the strips forming parts of the machine.

My invention relates to an improvement in a process of manufacture of scythes and sickles. Hitherto scythes and sickles have mostly been made by forging out straight strips of metal. In this mode of manufacture there is a loss of material due to burning, &c. Besides this the duration of the process and the quality of the work depend entirely upon the skill of the workman.

The process forming the object of this invention which obviates these disadvantages consists in imparting to straight metal strips of suitable section the required curvature of the scythes or sickles by rolling. The device used for this purpose is provided with cylindrical or conical rolls, which are so adjusted that the strip of metal is stretched to a large extent at one edge and imparted the shape of a helical surface. To make the latter elliptical in shape, as required in the manufacture of scythes and sickles, the rolling device is so arranged that after the rolls have effected one or more revolutions they are alternately pressed at one time more strongly together and at another time returned to their position of initial adjustment. By means of this arrangement the strip of metal passing through the rolls is alternately curved more or less sharply and assumes the required elliptical form, Figs. 1, 3, 4, and 5. The rolling process has been described in its essence in the German specifications, Nos. 55,692, 64,571, 21,547, and 87,681.

The scythe and sickle blades thus obtained and still connected together are separated, as shown in the drawings, Figs. 3 to 6. A point is then formed on them and also with a thick part and socket to receive a wooden handle. The sections of the blades are shown in Figs. 7 to 9.

The hardening, grinding, &c., of the scythe and sickle blade are effected in the usual way.

As illustrating a mechanism whereby my improved method may be carried out, referring to Figs. 10 to 13, $a\ b$ represent two rolls revolving each at the same speed, the axes of which form an angle with each other, $c\ d$ two guiding-rolls for the strips, and $e$ an adjusting and beading roll, and these rolls are rotated by suitable means as the bar progresses through the machine.

In operation the steel bar, of suitable cross-section, is introduced between the guiding-rolls $c\ d$, which force the strips through the guide $h$ and between the rolls $a\ b$, which are so arranged that the bar is stretched by the pressure exerted on its outer edge and leaves the rolls in the form of a ring. The bar striking against the beading-roll $e$, the edge $k$ thereof is turned up, as indicated in Figs. 12 and 13. By suitable adjusting means, shown in the form of stirrups, the rolls can be adjusted with proper relation to each other in a manner well understood and the shape or form of the completed article, as desired.

Having described my invention, I declare that what I claim is—

The hereinbefore-described method of forming scythe and sickle blanks which consists in rolling a strip or bar of metal into the form of a helix with a thickened outer edge and in such manner that the edges of successive and contiguous portions thereof will conform to the shape of the articles to be formed and in finally severing the strip at separated points, substantially as described.

In witness whereof I have hereunto signed my name in the presence of two subscribing witnesses.

RUDOLF COMMICHAU.

Witnesses:
 OTTO STORCK,
 WILLY ENGER.